United States Patent Office 3,781,410
Patented Dec. 25, 1973

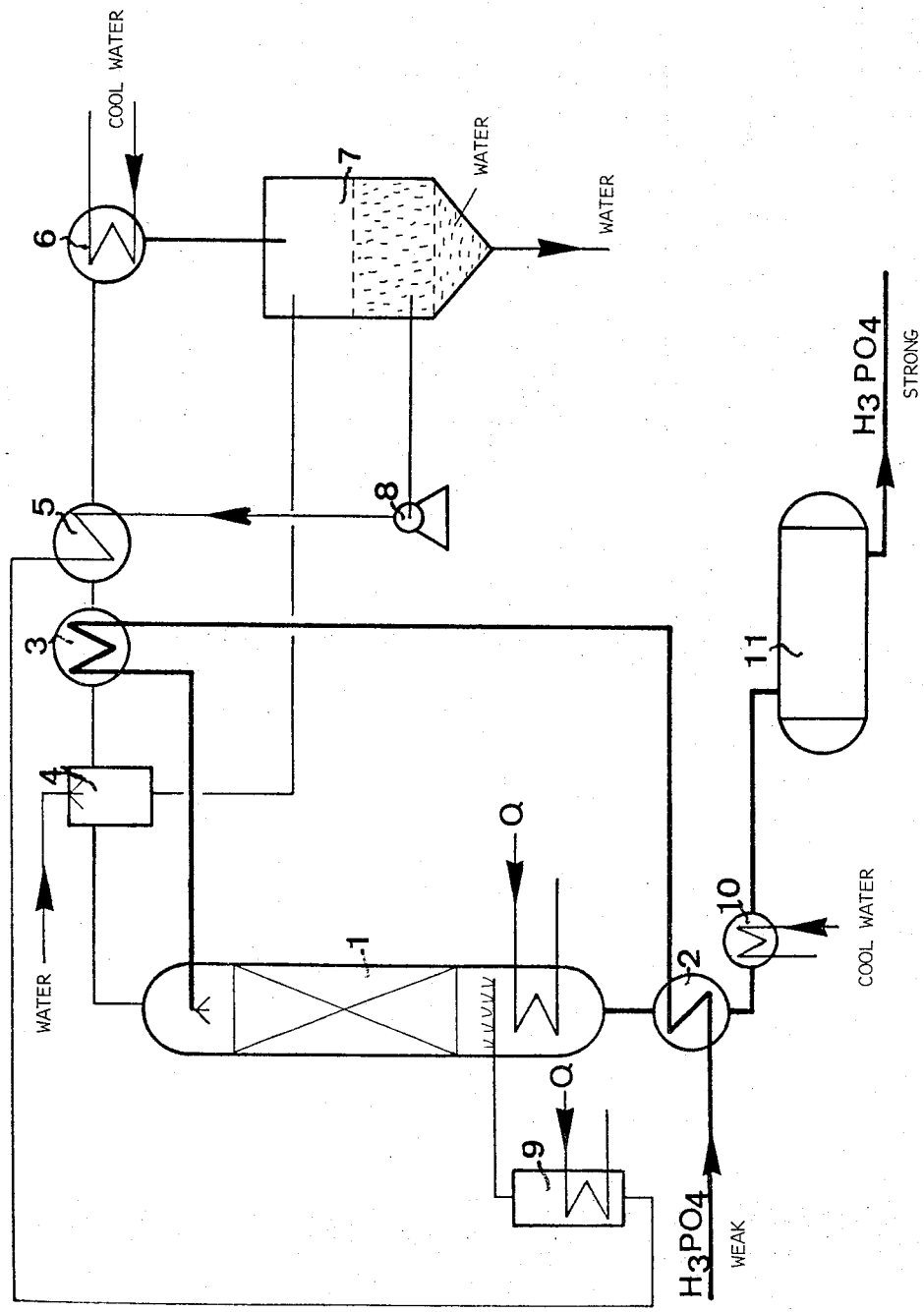

3,781,410
PROCESS FOR THE CONCENTRATION AND
DEFLUORINATION OF PHOSPHORIC ACID
Georg von Semel, Dortmund, Germany, assignor to
Friedrich Uhde GmbH, Dortmund, Germany
Filed July 12, 1971, Ser. No. 161,842
Claims priority, application Germany, Sept. 12, 1970,
P 20 45 180.3
Int. Cl. C01b 25/26
U.S. Cl. 423—321                6 Claims

ABSTRACT OF THE DISCLOSURE

A process for raising the concentration of phosphoric acid from the 30 to 40 percent to 70 percent and more at low energy requirements while removing any fluorine components. Weak phosphoric acid is contacted and stripped with a low boiling substance that is substantially insoluble in water and phosphoric acid. The vapors are then condensed, the condensates collected and separated, the water expelled is discharged, and the substance is recycled in the process.

BACKGROUND OF THE INVENTION

The present invention relates to a process for concentrating weak phosphoric acid with simultaneous removal of fluorine components contained in the phosphoric acid.

The technical grade phosphoric acid produced by the wet process at a concentration of 30 to 40 percent must be concentrated to 70 percent and more to ensure an economical utilization. This concentration step is intended to remove at the same time fluorine components contained in the phosphoric acid.

It is known to concentrate the weak phosphoric acid with the aid of conventional distillation processes either at atmospheric pressure or under vacuum. In addition, it has been proposed in German Pat. DAS 1,293,729 to start from dilute aqueous phosphoric acid for producing a crystalline, pyrophosphate-free orthophosphoric acid by azeotropic distillation, in the presence of a water carrier agent miscible with the orthophosphoric acid, at a pressure of less than 110 mm. Hg and a temperature below 150° C.

In another known process, the weak phosphoric acid is heated by means of an immersion burner with vaporization of the water and discharge of the water vapor.

Known processes have the disadvantage to cause serious corrosion whenever a high vaporization temperature for the water must be maintained because of atmospheric pressure. Distillation under vacuum is expensive by itself because of the equipment needed.

The use of immersion burners is expensive because of the concentrated liberation of thermal nergy and because of serious corrosive attack on the burner owing to the high temperatures. Residues from the fuel gas pollute the concentrated phosphoric acid.

SUMMARY OF THE INVENTION

The object of the invention is to provide simple means for raising the concentration of phosphoric acid from the 30 to 40 percent to 70 percent and more at low energy requirements while removing at the same time any fluorine components.

According to the invention, the problem is solved by contacting the weak acid with a stripping fluid, viz. the vapor of a low-boiling organic or inorganic substance that is sparingly soluble or insoluble in water and phosphoric acid, condensing the vapors of water, organic substances and fluorine components, collecting and separating the condensates, discharging the water expelled, and recycling the substance to the process.

Depending on prevailing technical or economic conditions, the process can be carried out at atmospheric pressure, at positive pressure, under vacuum, continuously or intermittently.

The particular advantages of the invention are that the water is expelled at low temperatures, that the condensates can easily be separated because of their insolubility or low solubility with respect to each other, and that the stripping fluid can be recycled. Cheap fluids are used for stripping, for example light gasoline. It is another advantage of the invention that concentration is performed at low bottom temperatures.

The stripping process yields a product that requires nothing but cooling. The concentrated phosphoric acid does not contain any soluble substances that might adversely affect further processing.

BRIEF DESCRIPTION OF THE DRAWINGS

A diagrammatic example of an application of the invention is shown on the attached drawing.

DESCRIPTION OF PREFERRED EMBODIMENT

The weak phosphoric acid is admitted to a stripping column 1 where its concentration is raised from 30 to 40 percent to 70 percent and more. The weak phosphoric acid is preheated in heat exchangers 2 and 3 before it is sent to the top of the stripping column 1. The weak acid descends across the interior of the column and is contacted by a countercurrrent stream of superheated stripping fluid vapors. Part of the water expelled from the weak acid together with fluorine components. The acid concentration rises considerably. The vapor mixture leaving the stripping column 1 is first admitted to a receiver 4 where partial condensation is achieved by water injection. The vapor mixture then goes to heat exchangers 3 and 5 where further condensation takes place. The condensate is cooled to ambient temperature in a cooler 6 before it is sent to a separator 7. This separator also receives the condensate/water mixture leaving the receiver 4. In the separator, the water is removed from the low boiling stripping fluid. By means of a pump 8, the stripping fluid is withdrawn from the separator and is recycled through the heat exchanger 5 to an evaporator and superheater 9. The superheated vapors pass from the evaporator and superheater 9 to the stripping column 1.

The concentrated phosphoric acid collected in the bottom of the stripping column 1 is cooled to ambient temperature through the heat exchanger 2 and a cooler 10 before it is sent to a stock tank 11.

Stripping column 1 and the evaporator and superheater 9 are equipped with heating facilities which supply the thermal energy required for the process. Cheap waste heat may be used in the heat exchangers because of the low temperature level of the process. The water withdrawn from the separator 7 is discharged and may be treated, if required.

The following examples are cited to evidence the data of a concentration test.

EXAMPLE 1

In a vessel with a heating device, superimposed distillation unit, and cooler, a quantity of 250 cm.$^3$ of pure phosphoric acid at 40 percent was heated to 120° C. Vaporized and superheated light gasoline (final boiling point 110–115° C.) was then introduced into the acid. The effluent gasoline/water vapor mixture was condensed with subsequent separation of gasoline and water in a separator. The gasoline was vaporized again, the vapors were returned into the vessel holding the phosphoric acid. The vapor temperature of the gasoline/water mixture at the outlet of the distillation vessel was 94–97° C. The bottom temperature ranged from 106 to 118° C. After distillation, the concentration of the phosphoric acid had risen to 74.5 percent $H_3PO_4$. The quantity of vaporized gasoline was 343 cm.³ The ratio of vaporized gasoline: vaporized water from $H_3PO_4$ was 2.37:1.

EXAMPLE 2

A quantity of 250 cm.³ of technical grade phosphoric acid at 41 percent was treated as described for Example 1. The vapor temperature at the outlet of the distillation vessel was 91–97° C. The bottom temperature ranged from 110–116° C. The concentration of the phosphoric acid rose to 71 percent $H_3PO_4$. The quantity of vaporized gasoline was 350 cm.³. The ratio vaporized gasoline: vaporized water from $H_3PO_4$ was about 3.13:1. 50 percent of the original content of fluorine components had been expelled.

What I claim is:

1. A process for concentrating weak phosphoric acid with simultaneous removal of fluorine components contained in phosphoric acid comprising contacting and stripping the weak phosphoric acid with vaporized light gasoline that is sparingly soluble or insoluble in water and phosphoric acid, condensing the vapors of water, light gasoline, and fluorine components, collecting and separating the condensates, discharging the water expelled, and recycling the light gasoline to the process wherein the process is carried out at atmospheric pressure or at a positive pressure or under vacuum.

2. The process according to claim 1, characterized by superheating said vapor before admission into the phosphoric acid.

3. The process according to claim 1, characterized by concentrating the phosphoric acid continuously.

4. The process according to claim 1, characterized by concentrating the phosphoric acid intermittently.

5. A process for concentrating weak phosphoric acid, having 30 to 40 percent phosphoric acid, comprising the steps of contacting the weak phosphoric acid with a vaporized light gasoline that is sparingly soluble in water and phosphoric acid, condensing the vapors of water and light gasoline, separating the condensate, discharging the water expelled, and recycling the condensed light gasoline to the process, wherein the ratio of light gasoline to water in the vapors is in the range of 2.37:1 to 3.13:1 and the weak phosphoric acid maintained at a temperature of 106° to 118° C.

6. A process for concentrating weak phosphoric acid, having 30 to 40 percent phosphoric acid, comprising the steps of:
(I) contacting the weak phosphoric acid counter-currently with vaporized and superheated light gasoline to produce a residue rich in phosphoric acid and a vaporous product containing light gasoline, water, and fluorine components;
(II) collecting the residue;
(III) collecting the vaporous product as a condensate;
(IV) separating the condensate into water and light gasoline;
(V) recycling the light gasoline to step (I) wherein the light gasoline has a boiling point in the range of 110° to 116° C., the ratio of light gasoline to water in the vaporous product is in weight ratio of 2.37:1 to 3.31:1, the temperature of the weak phosphoric acid is maintained in the range of 106 to 118° C.

References Cited

UNITED STATES PATENTS

| 2,962,357 | 11/1960 | Williams et al. | 23—165 |
| 3,397,123 | 8/1968 | Cull | 23—165 |
| 3,273,713 | 9/1966 | Parish | 23—165 |

FOREIGN PATENTS

| 1,456,263 | 9/1966 | France | 23—165 |

OSCAR R. VERTIZ, Primary Examiner

G. A. HELLER, Assistant Examiner